Patented Aug. 1, 1933

1,920,756

UNITED STATES PATENT OFFICE 1,920,756

SOFTENING WATER

Otto Liebknecht, Neubabelsberg, Germany, assignor to The Permutit Company, New York, N. Y., a Corporation of Delaware No Drawing. Application September 16, 1931, Serial No. 563,231, and in Germany December 1, 1930

7 Claims. (Cl. 210—24)

This invention relates to softening water; and it comprises a process wherein salt-treated serpentine is alternately used for softening water by contact therewith and is regenerated by a solution of common salt, the serpentine being sometimes activated by a previous treatment with various chemicals; all as more fully hereinafter set forth and as claimed.

It is the usual assumption that base exchange to any useful extent is a specific property of the zeolites or hydrated alumino-silicates and certain cognate minerals, particularly glauconite. The exchange power is supposed to be in some way connected with the particular chemical structure characterizing the alumino-silicates.

I have however found that useful base exchange actions are exercised by quite another class of minerals; those mineralogically known as the serpentine class and that they can advantageously be used in softening water. They are hydrated silicates of magnesia, although as minerals they often contain minor amounts of other bases replacing magnesia; ferrous oxid, lime and, sometimes, nickel oxid. Minor proportions of alumina are often present. The serpentines are probably, at least sometimes, alteration products of minerals of the types of olivine and pyroxene. Serpentine may occur in massive, lamellar, foliated, fibrous or crystalline form. Some of the fibrous forms, such as chrysotile, are on the market as "asbestos". Not all commercial "asbestos" is serpentine, but much of it is. For the present purpose, the massive or rocky forms of serpentine, which can be converted into granules of the size of those ordinarily used in a softener, are deemed best, as they enable the use of the ordinary type of softener, upflow or downflow, without changes in connections. However, fibrous forms may be used and enable the employment of new types of softener.

Most of the minerals of the serpentine group are useful for the present purposes. Meerschaum, soapstone, talc and the like may be used. There is some advantage in the use of the less pure forms of serpentine, those containing other bases than magnesia, such as ferric or ferrous oxid and alumina. When a mineral containing nickel oxid is available, it is well adapted for my purposes. One typical serpentine which I have found available contains 2 to 11 per cent of iron oxid and 0.5 to 3 per cent alumina.

Since serpentine is a hydrated silicate of magnesia, it is somewhat unexpected that it should be available for general use in softening hard water, in which part of the hardness is often due to magnesia. It is, however, a fact that serpentine can be used for softening such water.

In a specific embodiment of the present invention, utilizing the impure serpentine rock mentioned containing a little iron oxid and a minor amount of alumina, granulated rock was treated with a common salt solution to provide it with exchangeable base. The fibrous, dark olive, granulated, salt-treated mineral, in suitable grain size, used in an ordinary softener evinced an exchange power equivalent to 0.4 to 0.5 per cent CaO, this exchange power remaining constant after long use in softening water with alternate softening and regeneration. The mineral proved resistant to water containing a high percentage of carbon dioxid.

While the serpentine can be used in the raw condition with merely a prior treatment with common salt, the exchange power can be increased somewhat without detriment to the physical qualities, by various treatments additional to the treatment with common salt, as, for instance, with a solution of an alkali silicate, of an alkali carbonate, or of a caustic alkali. These solutions improve the activity of the surface of the granules. Activation can also be secured with acid reacting solutions, that is, those developing acid by hydrolysis and acid to test paper, such as solutions of iron, aluminum and chromium salts. Mild actual acidity, such as that of an alkali bisulfate solution or of highly dilute hydrochloric acid, is also useful in activating. Alternate treatments with alkaline reacting solutions and acid reacting solutions, are also useful. A treatment with common salt may be intercalated. In one specific way of treating serpentine, I treated the serpentine with waterglass solution, washed and then treated with a solution of aluminum sulfate. Iron chlorid could have been substituted for the aluminum sulfate. The order of treatments can be reversed.

In one specific example of improving serpentine by surface activation, a fibrous slaty serpentine was granulated to a size passing a screen with 140 meshes per square centimeter and held by a 900 mesh screen. The granules were immersed in a 3 per cent ferric chlorid solution. The ferric chlorid was then removed and the granules washed. The washed granules were then treated with a solution of waterglass made by diluting commercial sirupy silicate of soda with 10 times its weight of water. The silicate of soda solution was removed and the granules washed with neutral water. The washed granules were then treated with a common salt solution to provide exchangeable base. After removing the salt solution, the product was ready for use in a softener. It could be marketed moist or after drying. By the described treatment, the base exchange power was increased between 10 and 30 per cent. In one particular sample, the base exchange power increased from between 0.4 and 0.5 per cent to 0.6 per cent CaO.

The activating treatments mentioned can be effected with solutions at the ordinary pressure and temperature or at higher temperatures and at higher pressures. However, in the case of acid solutions, high temperatures and high concentrations must be used with care to avoid breaking down the mineral.

Untreated raw serpentine sometimes, but not always, gives a turbidity to the water for a few cycles when first used in a softener. The various chemical treatments mentioned, in addition to increasing the exchange capacity, also obviate this tendency toward giving turbid water. The tendency may also be obviated by heating the serpentine under either oxidizing or reducing conditions at temperatures above 100° C. The temperature should not be carried sufficiently high to effect complete dehydration and advantageously not above 300 to 500° C. Preheated mineral can be subjected to the various activating processes described.

It is often desirable to remove from a water the bicarbonate or carbonate radical in addition to eliminating the hardness or calcium and magnesium. This can be accomplished by treating the minerals of this serpentine group with an acid (such as sulphuric acid) thereby imparting a replaceable hydrogen ion. This hydrogen of the acid-treated serpentine reacts with the bicarbonate or carbonate of the water, whereby this bicarbonate or carbonate is decomposed, liberating free $CO_2$. This general process of using hydrogen zeolites to remove bicarbonates is well known in the art (see McElroy U. S. 1,811,587) but the particular improvement which I claim lies in the use of the acid extracted materials of the serpentine group for this purpose. Some of these materials, and in particular asbestos, are quite resistant to the attack of acids and thus offer a more suitable physical structure to retain the hydrogen imparted by the acid treatment without appreciable disintegration of the granules. This is a special advantage over other substances hitherto available for this purpose.

What I claim is:—

1. In softening water, the process which comprises alternately softening hard water by contact with serpentine and regenerating said serpentine by contacting with a solution of sodium chlorid.

2. In the process of claim 1, employing a serpentine with activated surfaces.

3. In the process of claim 1, employing a serpentine with surfaces activated by an acid reacting solution.

4. In the process of claim 1, employing a serpentine with surfaces activated by an alkaline reacting solution.

5. In the process of claim 1, employing a serpentine with surfaces activated by both an acid reacting and an alkaline reacting solution used in succession.

6. In the process of claim 1, employing a serpentine baked to resist the disintegrating action of water.

7. In the process of claim 1, employing a baked serpentine having activated surfaces.

OTTO LIEBKNECHT.